United States Patent [19]
Hano et al.

[11] 3,709,423
[45] Jan. 9, 1973

[54] AUTOMATIC WELDING APPARATUS

[75] Inventors: Masaaki Hano; Takeshi Kiyotake; Minoru Oike, all of Yokohama, Japan

[73] Assignee: Nippon Kokan Kabushiki Kaisha, Tokyo, Japan

[22] Filed: Aug. 12, 1970

[21] Appl. No.: 63,100

[30] Foreign Application Priority Data

Aug. 14, 1969 Japan ................................ 44/64031

[52] U.S. Cl. ................... 228/44, 29/200 P, 219/124, 228/6, 228/45
[51] Int. Cl. ............................................. B23k 19/00
[58] Field of Search .................... 228/4, 25, 44, 45, 6; 29/200 J, 200 P; 219/124, 125, 130

[56] References Cited

UNITED STATES PATENTS

| | | | |
|---|---|---|---|
| 3,159,129 | 12/1964 | Lindmark | 113/131 |
| 3,164,713 | 1/1965 | Banks et al. | 219/9 X |
| 3,444,353 | 5/1969 | Ogden et al. | 219/125 |
| 3,561,663 | 2/1971 | Wenzlaff | 228/25 |

Primary Examiner—J. Spencer Overholser
Assistant Examiner—R. J. Craig
Attorney—Steinberg & Blake

[57] ABSTRACT

An automatic welding apparatus for applying a weld to the intersection between a pair of plates. A guide is situated at the intersection to guide a welding unit which will deposit the weld at the intersection. This guide is carried by a supporting structure to which a force is applied by a force-applying assembly in such a way that the guide is pressed inwardly toward the intersection with a pressing force extending along a pressing line which bisects the angle defined between the plates which are welded to each other. The force-applying assembly applies to the supporting structure a pair of mutually perpendicular component forces, and the pressing force with which the guide is pressed into the intersection is the resultant of these component forces.

12 Claims, 5 Drawing Figures

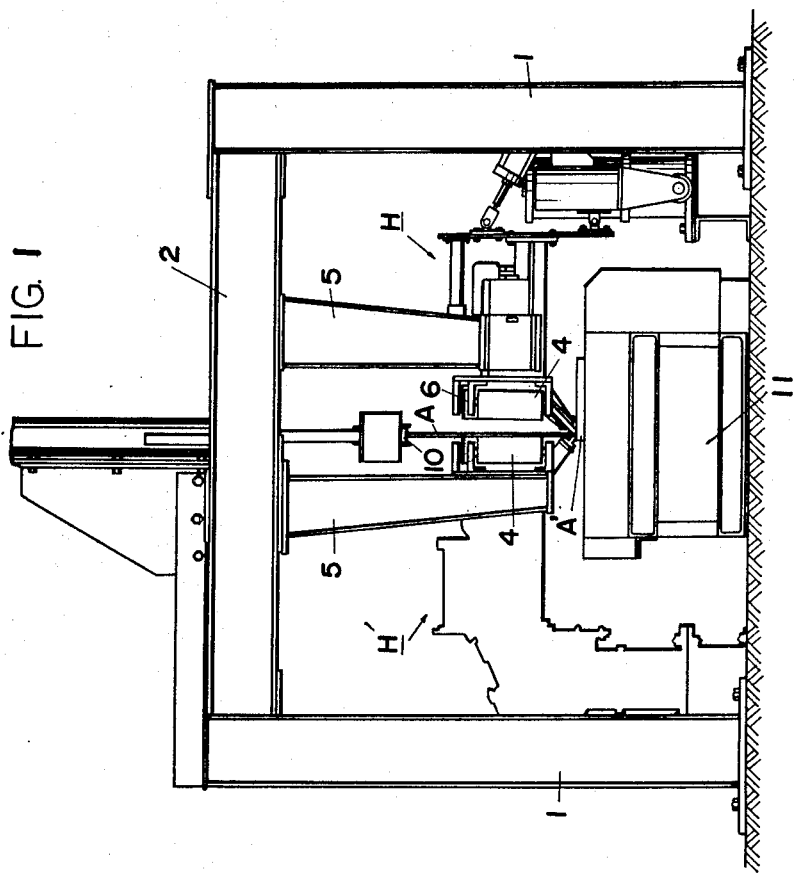

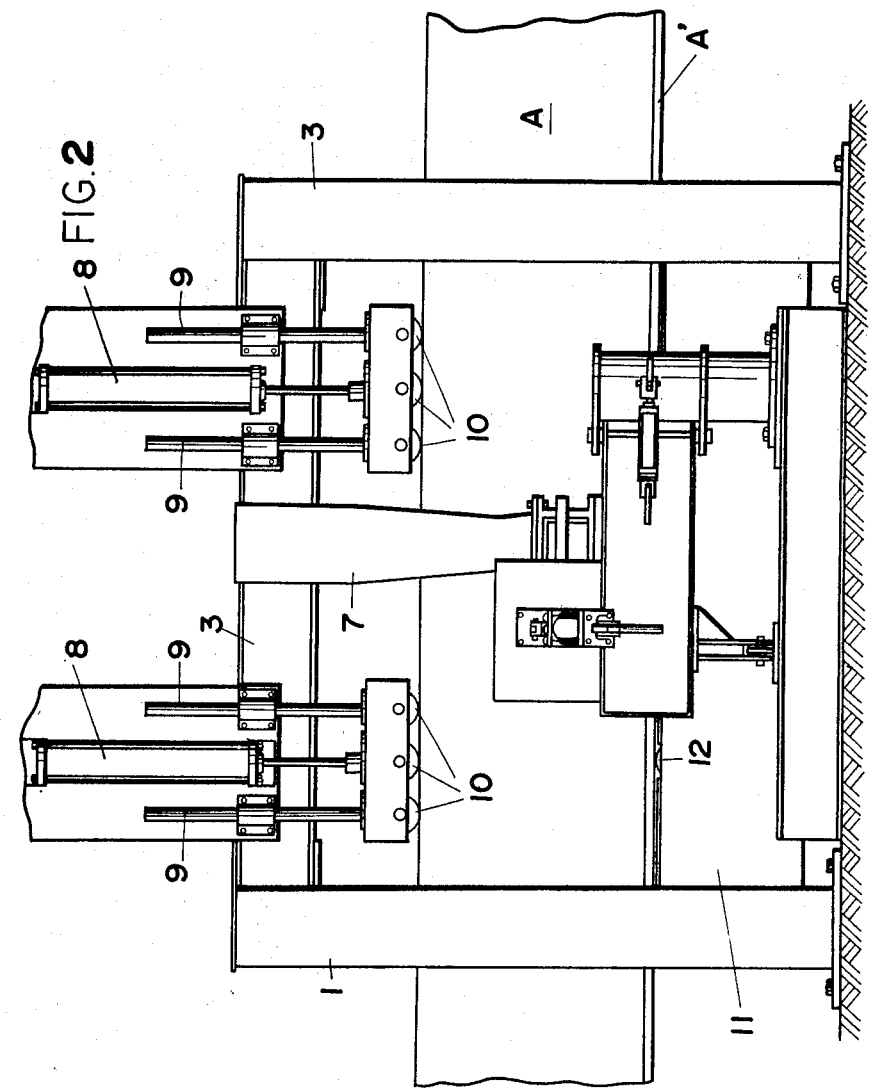

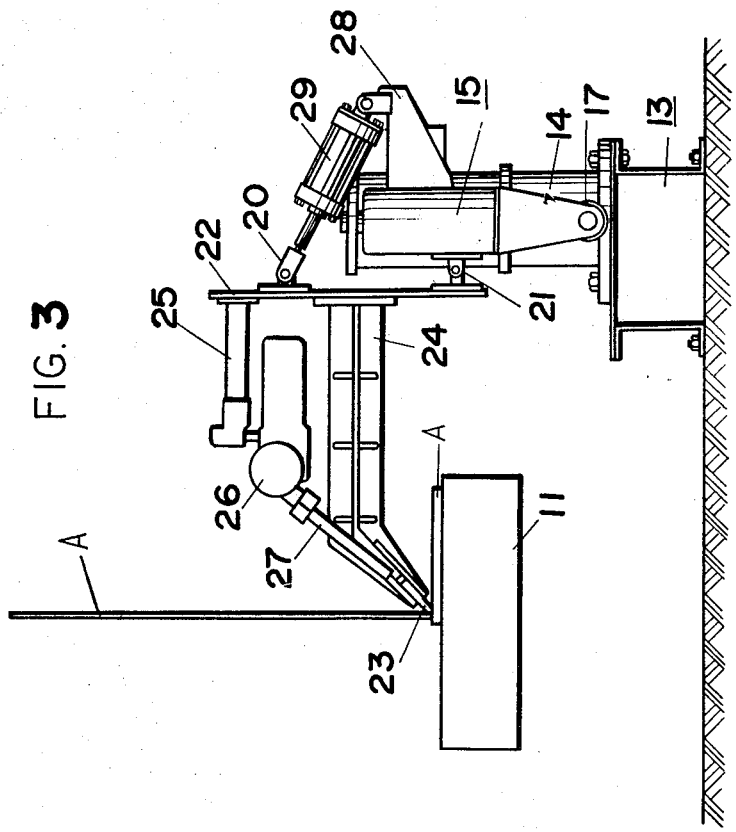

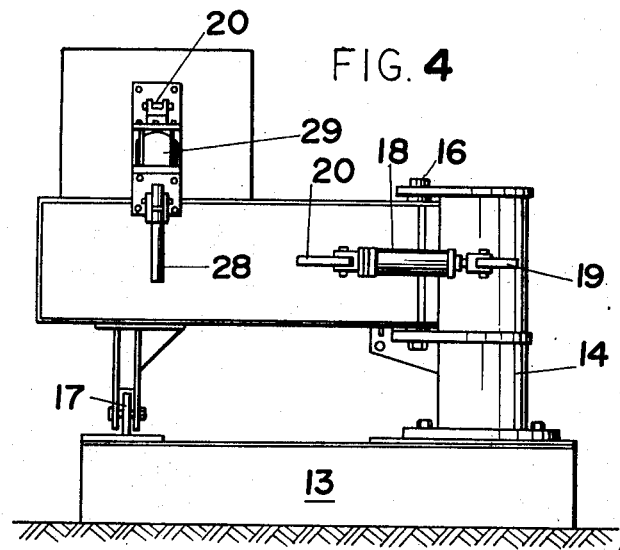
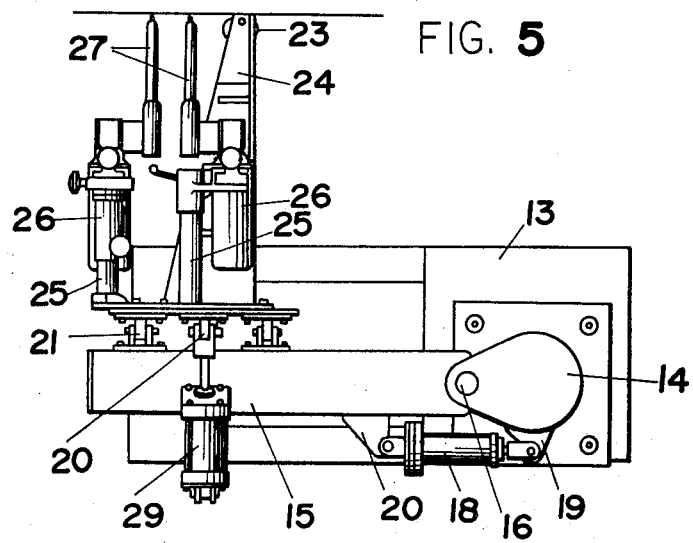

AUTOMATIC WELDING APPARATUS

BACKGROUND OF THE INVENTION

The present invention relates to welding.

In particular, the present invention relates to automatic welding apparatus.

The present invention relates specifically to structure for guiding a welding means which deposits a weld at the intersection between a pair of plates. Thus, the structure of the invention may be used with apparatus which will automatically weld to each other plates which form frameworks of any angular configuration such as frameworks which in cross section have the shape of T, of a H, I, or the like.

There are at the present time known constructions available for guiding the welding nozzle of a welding machine. For instance, there is a known structure which operates to drive a Unionmelt welding machine on a beam, along a surface of a flange, which thus acts as a guide. Also there is a construction where a pair of welding nozzles are directed to each other and are hung from an upper portion of the plates which are to be welded so as to sandwich a vertical plate between the welding nozzles while applying fillet welds at the intersections of the plates.

However, apparatus of the above type have inherent problems resulting from the necessity of reversing or tilting the apparatus so as to assume a proper position with respect to the beams which are welded. These latter positioning problems have proved to be extremely disadvantageous because of their inefficiency, and the result is that especially in mass production, the operations cannot be carried out with the required low cost.

The above system according to which the structure is hung from an upper portion of the plates has been utilized for welding outside steel plates of the hull of a ship to inner longitudinal beams. However, this type of apparatus involves an undesirably high cost and at the same time it involves unavoidable inconveniences in that the equipment as well as the adjustment of the welding nozzles are hung from the top of the sections which are welded, requiring unavoidable and extremely careful arrangement of welding wires, and involving the undesirable and unavoidable situation of wire supplier motors or the like at the region of the upper portion of the structure which is welded, so that the entire apparatus must unavoidably be situated at an undesirably high elevation creating considerable inconvenience and high cost.

In order to carry out proper welding operations at the intersection between a pair of plates which are to be welded to each other, it is necessary to satisfy at least a pair of important requirements, one of which is that the angle of the welding nozzles should be maintained constant and situated so that the nozzles are properly directed toward the intersection which is to receive the weld, while the other is that the welding nozzles should never deviate from the intersection between the plates which are to be welded to each other.

SUMMARY OF THE INVENTION

It is accordingly a primary object of the present invention to provide an apparatus which will meet the above requirements in a manner which is far less expensive and far more convenient than is possible with known constructions, while at the same time achieving a far greater precision in the welding operations than has heretofore been possible.

Thus, it is an object of the present invention to provide an automatic welding apparatus which involves only relatively low cost.

Also, it is an object of the present invention to provide an automatic welding apparatus which may be operated without requiring a great deal of skill on the part of the operator.

Furthermore, it is an object of the present invention to provide an automatic welding apparatus capable of effectively guiding nozzles to the parts to be welded while achieving a welding structure of very high quality.

A further object of the present invention is to provide an automatic welding apparatus which makes it possible to very easily and conveniently remove the welding nozzles from the welding position to enable adjustment or repairs, if and when required, to be carried out in extremely convenient manner.

According to the invention the automatic welding apparatus will deposit a weld at the intersection between a pair of plates. A guide means is situated at the intersection and a support means supports the guide means. A force-applying means coacts with the support means for applying through the latter to the guide means a pressing force pressing the guide means inwardly toward the intersection along a pressing line which extends from the intersection between the plates into a space defined therebetween and in which the guide means is accommodated. The support means also carries a welding means for depositing a weld at the intersection with the welding means being supported with respect to the guide means at a depositing for properly depositing a weld during the time hen the guide means is urged along the pressing line by the action of the force-applying means, so that in this way the guide means will act to properly guide the welding means.

BRIEF DESCRIPTION OF DRAWINGS

The invention is illustrated by way of example in the accompanying drawings which form part of this application and in which:

FIG. 1 is a partly schematic transverse elevation of an automatic welding apparatus of the invention;

FIG. 2 is a schematic side elevation of the structure of FIG. 1;

FIG. 3 is a partly schematic front elevation of the structure of the invention;

FIG. 4 is a side elevation of the structure of FIG. 3 as seen from the right of FIG. 3; and FIG. 5 is a top plan view of the structure of FIG. 4.

DESCRIPTION OF A PREFERRED EMBODIMENT

Referring first to FIGS. 1 and 2, there are illustrated therein a pair of plates A and A' which are to be welded to each other, the plate A' being horizontal and the plate A being vertical and having its bottom edge engaging the top face of the plate A'. These plates will be welded to each other at their intersection to form a T-beam. A feed means is provided for feeding the plates longitudinally, in a horizontal direction from the right toward the left in FIG. 2 for example.

The plates move between vertical beams 1 which are fixed at their bottom ends to the floor or any other base structure. The beams 1, of which there are four in the illustrated example, are interconnected at their top ends by transverse beams 2. Thus, the pair of aligned beams 1 shown at the left in FIG. 2 are interconnected at their top ends by one transverse beam 2, while the pair of right beams 1, as viewed in FIG. 2, are interconnected at their top ends by a second transverse beam 2. The midpoints of the transverse beams 2 are connected to each other by an upper longitudinal central beam 3 visible in FIG. 2.

Each of the transverse upper beams 2 carries a pair of downwardly directed arms 5. The vertical plate A passes between these arms 5, while the horizontal plate A' passes beneath the arms 5. Each of the arms 5 carries through suitable supporting structure a pressure roller 4 which has a vertical axis and which presses against a side surface of the plate A. Thus there are at each end of the frame 1 – 3 a pair of rollers 4 which engage the vertical plate A so as to maintain the latter vertical.

The central upper longitudinal beam 3 carries a pair of arms 7 one of which is visible in FIG. 2, these arms being located directly behind the arms 5 in FIG. 1. Each arm 7 carries a pressure roller 6, in the same way that each arm 5 carries a pressure roller 6, in the same way that each arm 5 carries a pressure roller 4, so that the pair of rollers 6 act centrally between the end beams 1 on the plate A to maintain the latter vertically oriented.

The central longitudinal beam 3 further carries a pair of fluid-pressure units 8 which serve to urge downwardly a pair of roller assemblies 10 engaging the upper edge of the vertical plate A and guided by way of suitable vertical guide rods 9 which extend through vertical sleeves in the manner shown in FIG. 2. The pressure rollers 10 thus engage the top edge of the plate A and urge the latter downwardly against the lower plate A'.

Thus, with the structure described above there are at the left side of the plate A, as viewed in FIG. 1, a group of rollers engaging the plate A and maintaining it vertical, with the positions of the latter rollers being determined by the above-described supporting structure, so as to maintain the plate A precisely vertical, with the plate urged downwardly by the rollers 10. On the other, right, side of the plate A, as viewed in FIG. 1, are the rollers of the second group also serving to maintain the plate A vertical, and the latter, right rollers 4 and 6 may be urged toward the left by suitable fluid-pressure devices, which are not illustrated since they form no part of the invention, and thus in this way the right rollers 4,6 of FIG. 1 will press the plate A against the left rollers 4,6 the positions of which are maintained fixed, so that in this way the position of the plate A is determined.

In addition it is to be noted that the rollers 6 carried by the arms 7 and supported by the central beam 3 are situated in fairly close prosimity to the area where the actual welding takes place, so that these rollers are subjected to a more intense heat than the other rollers and are consequently made of a larger diameter.

Beneath the plate A' are a plurality of horizontal feed rollers 12 which directly engage the lower surface of the plate A' and serve to feed the latter together with the plate A. This feed structure is carried by a suitable supporting framework 11 and the group of feedrollers 12 are driven from any suitable unillustrated motor carried by the framework 11 and connected to any suitable source of energy so that through this feed means it is possible for the plates A,A' to be fed longitudinally at the required speed with the rollers 10 acting to press the vertical plate A at its bottom edge downwardly against the horizontal plate A' while at the same time pressing the latter against the feed rollers 12.

A pair of assemblies $H_1$ and $H_2$ of the present invention are respectively situated at opposite sides of the plate A for achieving the automatic and simultaneous deposition of fillet welds at the intersections between the plates A and A' at opposite sides of the lower edge of the plate A. Since these assemblies $H_1$ and $H_2$ are identical, with the only difference being in their orientation so that they form mirror images, only the assembly $H_1$ is described below and shown in detail in FIGS. 3–5.

Referring now to FIGS. 3–5, the structure illustrated therein includes a base assembly made up of the base plate 13 and the base member 14 fixedly mounted thereon. The base member 14 is in fact in the form of a vertically extending standard fixed at its bottom end to the base plate 13. The standard 14 fixedly carries a pair of ears directed toward the left, as viewed in FIG. 4, and supporting therebetween an elongated pivot pin 16. Between these ears is situated the right end of a swing-arm 15, as viewed in FIGS. 4 and 5, with the pivot pin 16 extending through suitable bores at the right end of the swing-arm 15, so that in this way the base structure 13,14 serves to support the swing-arm 15 for swinging movement about a vertical axis determined by the vertical pin 16.

The base 13 carries at its left end, as viewed in FIG. 4, a horizontal plate engaged by a roller 17 supported for rotary movement on a bracket fixed to and extending downwardly from the swing-arm 15, so that in this way the swing-arm 15 is capable of easily swinging about the pin 16.

A pressure source is provided in the form of a fluid-pressure cylinder 18 having in its interior a piston which extends outwardly to the right, as viewed in FIGS. 4 and 5, beyond the cylinder 18 and which is pivotally connected to a plate 19 which in turn is fixed to and projects horizontally from the standard 14. The left end of the cylinder 18, as viewed in FIGS. 4 and 5, is pivotally connected with a plate 20 which is fixed to and extends horizontally from the swing-arm 15. In the illustrated example the pressure source 18 is pneumatic so that through air pressure the arm 15 may be urged in a clockwise direction, as viewed in FIG. 5 for a purpose referred to in greater detail below. The arm 15 is urged in this clockwise direction of FIG. 5 during operation of the welding apparatus. At other times it is possible to act through the pressure source 18 on the arm 15 to retract the latter in a counterclockwise direction about the pin 16, as viewed in FIG. 5, also for a purpose referred to below.

A supporting plate 22 normally assumes the vertical position apparent from FIG. 3. A pivot 21 is fixedly carried by the swing-arm 15 close to the outer end of the arm 15 which is distant from the pivot 16. Actually a pair of these pivots 21 are provided, as is apparent from FIG. 5, with these pivots also being connected to a lower edge region of the supporting plate 22. The pivots 21 provide in this way a horizontal turning axis for the supporting plate 22.

This supporting plate 22 forms part of a support means which includes the elongated supporting arm 24 fixed at its right end to the supporting plate 22 and extending horizontally from the latter toward the intersection between the plates A, A'. At its end region which is distant from the supporting plate 22, the supporting arm 24 is inclined downwardly toward the left, as viewed in FIG. 3, so as to have the somewhat cranked configuration of a boomerang, and it is this downwardly inclined end region of the supporting arm 24 which carries the guide means 23 which in the illustrated example takes the form of a roller supported for free rotation by the supporting arm 24 of the support means.

The support means includes in addition to the supporting plate 22 and supporting arm 24 a mounting structure 25 fixed to an upper region of the supporting plates 22 and serving to mount thereon a pair of conventional welding means 26 which respectively include the pair of nozzles 27 which are situated in an inclined plane which contains the roller which forms the guide means 23. It is to be noted that this plane forms a 45° angle with the plates A and A', as is apparent from FIG. 3. Thus, the nozzles 27 of the welding means 26 are directed inwardly toward the intersection formed by the right angle between the plates A,A', and the guide means 23 guides the welding means for properly depositing a weld at the intersection between the plates A,A'. Referring to FIG. 5, if it is assumed that the work formed by the plates A,A' is fed to the left, then it will be seen that the deposited weld will also advance to the left away from the guide means 23.

A second pressure source 29 is provided between the supporting plate 22 and the swing-arm 15. This second pressure source is also pneumatic in the illustrated example and includes a cylinder pivotally connected by a bracket 28 to the swing-arm 15 at a region thereof distant from the pivot 16. This pressure source includes a piston slidable in the cylinder and having a piston rod connected by a pivot assembly 20 directly to the supporting plate 22 adjacent the upper end region thereof.

With the structure described above, the mounting structure 25 together with the supporting arm 24 and supporting plate 22 form a support means for supporting not only the guide means 23 but also the welding means 26, with the latter including the welding nozzles 27. The structure situated at the side of the supporting plate 22 opposite from the components 23-27 forms a force-applying means for acting through the support means to apply to the guide means 23 a pressing force pressing the guide means 23 inwardly toward the intersection between the plates A,A' along a pressing line which extends from the intersection between these plates into a space defined therebetween and in which the guide means 23 is accommodated.

In the illustrated example the plates A,A' are at right angles and this pressing line forms a 45° angle with the plates, thus bisecting the angle therebetween. The nozzles 27 of the welding means are also situated in exactly the same attitude, being directed at a 45° angle in the illustrated example.

The force-applying means includes the pressure source 18 which acts on the swing arm 15 of the force-applying means to urge the arm 15 about the vertical axis determined by the pin 16, so that in this way a horizontal component of force is transmitted through the pivot 21 to the supporting plate 22 and from the latter through the arm 24 to the guide means 23. On the other hand, the pressure source 29 acts on the plate 22 to tend to urge the latter, during operation, in a counterclockwise direction about the axis defined by the pivot 21, as viewed in FIG. 3, so that through the vertical plate 22 and the horizontal arm 24 a downwardly directed vertical component of force is applied to the guide means 23. Therefore, the force-applying means of the invention acts on the guide means 23 to apply thereto, through the support means, a pair of mutually perpendicular components of force which in the illustrated example are respectively horizontal and vertical. The pressing force with which the guide means 23 is urged inwardly toward the intersection between the plates A,A' is thus a result of these components, and since the components are perpendicular to each other the resultant force which determines the pressing force and the pressing line of the guide means 23 is at a 45° angle with respect to the horizontal and vertical plates which are welded to each other. In this way the guide means 23 is acted upon by the force-applying means through the support means to maintain the welding means 26, 27 not only at a proper angle but also at a position where it will not deviate from the intersection between the plates A,A'.

While the pair of pressure sources 18 and 29 of the force-applying means of the invention are illustrated as taking the form of pneumatic assemblies, it is to be understood that hydraulic assemblies or any other type of structure for providing suitable driving forces may be used.

Thus, with the structure of the invention there is the advantage of applying to each guide roller, for guiding the welding nozzles, horizontal and vertical component forces producing the resultant force at the required angle of 45°, so that the nozzles are constantly maintained at the desired angle without any requirement of a considerable skill on the part of an operator and at a relatively low cost. The nozzles cannot deviate from the intersection between the plates A,A' and are guided with the structure of the invention in such a way as to achieve welding of extremely high quality, thus enabling the assembled plates A. A' to form a welded beam structure of extremely high quality.

It is furthermore to be noted that with the structure of the invention the pressure source 18 can be actuated to swing the entire assembly about the pin 16 away from the plate A, toward the right, as viewed in FIG. 3, and in a counterclockwise direction, as viewed in FIG. 5, so that all of the structure, particularly the weld structure, can at any time be readily situated at a position where adjustment or repair, if and when required, can be carried out in an extremely convenient manner.

What is claimed is:

1. In an automatic welding apparatus for depositing a weld at the intersection between a pair of plates, support means, guide means carried by said support means and situated directly next to the intersection between the plates in a plane which is between said plates and contains said intersection, fluid-pressure means operatively connected with said support means for applying through the latter to said guide means a pressing force pressing said guide means in said plane inwardly toward the intersection between said plates along a pressing line in said plane extending from the intersection between said plates into a space defined therebetween and in which said guide means is accommodated, and welding means carried by said support means and having with respect to said guide means a position for properly depositing a weld at the intersection between said plates while said guide means is pressed along said pressing line inwardly toward the intersection and thus guides the welding means.

2. The combination of claim 1 and wherein said plane and said pressing line therein bisect an angle defined between said plates.

3. The combination of claim 2 and wherein the angle between said plates is a right angle.

4. The combination of claim 1 and wherein said fluid-pressure means applies to said support means a pair of component forces and said pressing force being a resultant of said component forces.

5. The combination of claim 4 and wherein said plates are at right angles to each other and are horizontal and vertical, respectively, said component forces also being horizontal and vertical, respectively, and said pressing force as well as said pressing line extending at a 45° angle into the intersection between said plates.

6. The combination of claim 5 and wherein said support means includes a substantially vertical supporting plate, a mounting structure carried by said supporting plate and mounting said welding means thereon, a supporting arm fixed at one end to said supporting plate and extending substantially horizontally therefrom toward said intersection, said supporting arm having distant from said supporting plate an end region carrying said guide means, and said fluid-pressure means being operatively connected with said supporting plate for acting through the latter on said supporting arm and guide means.

7. The combination of claim 6 and wherein said fluid-pressure means is operatively connected to said supporting plate at a side thereof opposite from said mounting structure and supporting arm and includes a swing-arm swingable about a vertical axis and a pivot pivotally connecting said supporting plate to said swing arm distant from said vertical axis, said pivot being connected to said supporting plate to support the latter for swinging movement about a horizontal axis with respect to said swing arm, and said fluid-pressure means including a pair of pressure sources one of which is operatively connected with said swing arm for urging the latter about said vertical axis inwardly toward said intersection and the other of which is connected between said supporting plate and swing arm for urging said supporting plate about said horizontal axis in a direction which provides for said guide means a component directed downwardly while said one pressure source provides for said guide means a component directed horizontally.

8. The combination of claim 7 and wherein said pressure sources are in the form of fluid-pressure cylinder-and-piston assemblies.

9. The combination of claim 7 and wherein said horizontal axis is situated at an elevation lower than said supporting arm.

10. The combination of claim 9 and wherein said supporting arm has at said end region a portion extending angularly from the remainder of said supporting arm inwardly toward said intersection and carrying said guide means.

11. The combination of claim 10 and wherein said guide means is in the form of a guide roller turnably carried by said end region of said supporting arm.

12. The combination of claim 11 and wherein a stationary base carries said swing arm for movement about said vertical axis, and feed means coacting with the plates which are to be welded for feeding the latter longitudinally with respect to said guide roller.

* * * * *